(12) United States Patent
Andersen et al.

(10) Patent No.: US 9,049,122 B2
(45) Date of Patent: Jun. 2, 2015

(54) BANDWIDTH PROBING MESSAGES

(75) Inventors: Trond G. Andersen, Oslo (NO); Pål-Erik S. Martinsen, Ås (NO)

(73) Assignee: Cisco Technology, Inc., San Jose, CA (US)

( * ) Notice: Subject to any disclaimer, the term of this patent is extended or adjusted under 35 U.S.C. 154(b) by 275 days.

(21) Appl. No.: 13/609,803

(22) Filed: Sep. 11, 2012

(65) Prior Publication Data
US 2014/0071839 A1 Mar. 13, 2014

(51) Int. Cl.
- *H04L 12/26* (2006.01)
- *H04L 12/701* (2013.01)
- *H04L 1/00* (2006.01)
- *H04L 29/12* (2006.01)

(52) U.S. Cl.
CPC .......... *H04L 43/0852* (2013.01); *H04L 43/087* (2013.01); *H04L 43/0882* (2013.01); *H04L 43/106* (2013.01); *H04L 61/2575* (2013.01); *H04L 61/2589* (2013.01); *H04L 61/2514* (2013.01)

(58) Field of Classification Search
None
See application file for complete search history.

(56) References Cited

U.S. PATENT DOCUMENTS

| | | | |
|---|---|---|---|
| 7,302,496 B1 | 11/2007 | Metzger | |
| 7,346,005 B1 | 3/2008 | Dowdal | |
| 7,738,383 B2 | 6/2010 | Wing et al. | |
| 8,248,942 B2 | 8/2012 | Wing et al. | |
| 2006/0209701 A1* | 9/2006 | Zhang et al. | 370/249 |
| 2011/0051607 A1 | 3/2011 | Begen | |
| 2011/0063992 A1* | 3/2011 | Weng et al. | 370/252 |
| 2012/0170470 A1 | 7/2012 | Duchenay et al. | |
| 2012/0236817 A1* | 9/2012 | Chen et al. | 370/329 |
| 2013/0083761 A1* | 4/2013 | Pandey | 370/329 |
| 2014/0052870 A1* | 2/2014 | Abuan et al. | 709/227 |
| 2014/0082217 A1* | 3/2014 | Lohner et al. | 709/245 |

FOREIGN PATENT DOCUMENTS

| EP | 1335525 A2 | 8/2003 | |
|---|---|---|---|
| WO | WO 2011085581 A1 * | 7/2011 | H04W 24/04 |

OTHER PUBLICATIONS

International Search Report and Written Opinion in counterpart International Application No. PCT/US2013/058674, mailed Dec. 17, 2013, 10 pages.
Postel, "Internet Protocol," RFC: 791, Sep. 1981, 49 pages.
Rekhter, et al., "Address Allocation for Private Internets," Network Working Group, Best Current Practice, RFC: 1918, Feb. 1996, 9 pages.

(Continued)

*Primary Examiner* — Omar Ghowrwal
(74) *Attorney, Agent, or Firm* — Edell, Shapiro & Finnan, LLC (57) ABSTRACT

Techniques are provided for detecting network characteristics. At a first endpoint device configured to communicate with a second endpoint device in a network, a request is made to a relay server in a network for an address and port assignment on the relay server. The address and port assignment are obtained from the relay server, and a probing packet is sent at a first time instance to the relay server at an address and port corresponding to the address and port assignment. The first time instance is stored in a timestamp field of the probing packet. A response packet responsive to the probing packet is then received from the address and port on the relay server at a second time instance. The second time instance is stored in a timestamp field of the response packet.

28 Claims, 7 Drawing Sheets

(56) References Cited

OTHER PUBLICATIONS

Deering, et al., "Internet Protocol, Version 6 (IPv6) Specification," Network Working Group, Standards Track, RFC: 2460, Dec. 1998, 39 pages.

Rosenberg, et al., "SIP: Session Initiation Protocol," Network Working Group, Standards Track, RFC: 3261, Jun. 2002, 269 pages.

Rosenberg, et al., "STUN—Simple Traversal of User Datagram Protocol (UDP) Through Network Address Translators (NATs)," Network Working Group, Standards Track, RFC: 3489, Mar. 2003, 47 pages.

Rosenberg, "Interactive Connectivity Establishment (ICE): A Protocol for Network Address Translator (NAT) Traversal for Offer/Answer Protocols," Internet Engineering Task Force (IETF), Standards Track, RFC: 5245, Apr. 2010, 117 pages.

Mahy, et al., "Traversal Using Relays around NAT (TURN): Relay Extensions to Session Traversal Utilities for NAT (STUN)," Internet Engineering Task Force (IETF), Standards Track, RFC: 5766, Apr. 2010, 67 pages.

\* cited by examiner

BANDWIDTH PROBING MESSAGES

TECHNICAL FIELD

The present disclosure relates to determining network characteristics for data communications.

BACKGROUND

Devices residing in networks with unknown bandwidth and latency metrics may experience disruptions in communications with other devices outside of the network. For example, network devices may have address information that is inaccessible by devices residing outside of the network. Thus, communications between devices outside of the network and devices within the network may be lost or misrouted. Network address translator devices can be deployed in networks to translate the address information of the network devices to a public address accessible by devices outside of the network.

DESCRIPTION OF EXAMPLE EMBODIMENTS

Overview

Techniques are provided for detecting network characteristics. These techniques may be embodied as a method, apparatus and instructions in a computer-readable storage media to perform the method. At a first endpoint device configured to communicate with a second endpoint device in a network, a request is made to a relay server in a network for an address and port assignment on the relay server. The address and port assignment are obtained from the relay server, and a probing packet is sent at a first time instance to the relay server at an address and port corresponding to the address and port assignment. The first time instance is stored in a timestamp field of the probing packet. A response packet responsive to the probing packet is then received from the address and port on the relay server at a second time instance. The second time instance is stored in a timestamp field of the response packet.

Example Embodiments

The techniques described hereinafter involve detecting network characteristics (e.g., bandwidth, jitter, delays, etc.).

An example network system/topology (hereinafter "network") is shown at reference numeral 100 in FIG. 1. The network 100 comprises a plurality of endpoint devices ("endpoints"), shown at reference numerals 102(1)-102(n). The endpoint devices 102(1)-102(n) are also referred to as "peer devices" or "peers." The endpoint devices 102(1)-102(n) may be, for example, desktop computers, laptops, mobile devices, tablet computing devices, etc. that are configured to send and receive information (e.g., data communications) across the network 100.

One or more of the endpoint devices 102(1)-102(n) may be configured to communicate with corresponding network address translator (NAT) devices ("NATs"). The NAT devices are shown at reference numerals 104(1)-104(m). For example, endpoint device 102(1) is configured to communicate with NAT device 104(1), endpoint device 102(2) is configured to communicate with NAT device 104(2), and so on. Endpoint device 102(n) is not configured to communicate with any NAT device. The endpoint devices in communication with the corresponding NAT device are said to reside "behind" its corresponding NAT device. The NAT devices are also referred to as "firewall devices" or "firewalls." The NAT devices 104(1)-104(m) may be, for example, any network device (e.g., computers, servers, etc.) that is configured to perform address translation techniques, as described hereinafter. The NAT devices 104(1)-104(m) are configured to communicate with a relay server device ("relay server") in the network 100, which is shown at reference numeral 106. The relay server 106 may be any network device (e.g., a server) that, for example, is publically accessible in the network 100. The relay server 106 may also be in communication with endpoint devices that are not in communication with any NAT device. For example, in FIG. 1, the relay server 106 is in communication with endpoint device 102(n), which is not in communication with a corresponding NAT device.

It should be appreciated that the network 100 may comprise any number of NAT devices. It should also be appreciated that the network 100 may not have any NAT devices. Network 100 may also have any number of relay servers (e.g., at least one) that are configured to enable communications with other network devices through the NAT device (e.g., since the NAT device has a public IP address). Additionally, it should be appreciated that the network 100 may comprise any number of endpoint devices.

NAT devices are typically deployed in a network to allow multiple endpoint devices to share a single public address. For example, endpoint devices may be arranged in one or more private networks (e.g., private Local Area Network (LANs)). Endpoint devices in a private network or private LAN may each have a private Internet Protocol (IP) (e.g., as defined in the Internet Engineering Task Force (IETF) Request for Comments (RFC) 1918) address that may be used only for communications within the private network. These private IP addresses may not be known to devices outside of the private network, and these address may not be routable on the public Internet. The private IP addresses may be mapped to a single public IP address that is assigned to and associated with a NAT device of the private network. Thus, in this example, the private network has a single public IP address (assigned to the NAT device) and the endpoint devices in the private network each have private IP addresses. For simplicity, it can be assumed that in FIG. 1, endpoint devices 102(1), 102(2) and 102(m) each reside in separate private networks.

When a source endpoint device in the private network sends network communications destined for devices outside of the private network ("outbound messages" or "outbound communications"), the NAT device in communication with the source endpoint device utilizes the public IP address for the message transmissions. That is, for an outbound communication, the public IP address is listed as the source address, and the recipient network device outside of the private network assumes that the outbound communication has originated from the NAT device instead of the source endpoint device in the private network. Likewise, when a device outside of the private network sends network communications destined for an endpoint device in the private network ("inbound messages" or "inbound communications"), the device outside of the private network sends the communication to the public IP address associated with the NAT device.

Thus, the NAT device is configured to map or "translate" its public IP address to private IP addresses of endpoints in the private network. One motivation for mapping a single public IP address, associated with the NAT, to many private IP addresses, associated with the endpoints, may be in response to IP version 4 (IPv4) address shortage problems. That is, there may be limited public IPv4 addresses that are available for assignment to network devices, and thus, to conserve these limited public IPv4 addresses, public IP addresses may be assigned only to NATs or firewall devices that are associated with endpoint devices located in a private network. Thus, when a system has multiple private networks, a single IPv4 address may be assigned to each private network (e.g., assigned to the NAT associated with the private network) instead of IPv4 addresses being assigned to each device within the private networks. Also, many network administrators also use NAT devices in misguided attempts to provide network security (e.g., topology hiding), and thus, translating the public IP address to private IP addresses can be important to ensure communications between network devices. It should be appreciated that the techniques described hereinafter may be implemented in networks using IPv4 addresses and protocols as well as IP version 6 (IPv6) addresses and protocols.

When an endpoint device residing behind the NAT initiates outbound communications, the outbound communications are first sent to a corresponding NAT device. For example, in FIG. 1, if endpoint device 102(1) ("Endpoint Device 1") is attempting to send data communications to endpoint device 102(n) ("Endpoint Device N"), the data communications are first sent from Endpoint Device 1 to the NAT device 104(1). The data communications originating from Endpoint Device 1 may initially indicate a source address associated with Endpoint Device 1 (e.g., the private IP address associated with Endpoint Device 1), but as the data communications are received by the NAT device 104(1), the NAT device 104(1) changes or translates the source address information from the private IP address associated with Endpoint Device 1 to the public IP address associated with the NAT device 104(1). The NAT device 104(1) then forwards the outbound communication to Endpoint Device N. Endpoint Device N, upon receiving the outbound communication, sees the public address of the NAT device and accordingly, believes that it is communicating with an endpoint having the same IP address as the NAT device 104(1). This happens, for example, since the source address in the outbound communication has been changed by the NAT device 104(1) from the private IP address of Endpoint Device 1 to the public IP address of the NAT device 104(1).

Inbound communications from, for example, Endpoint Device N to Endpoint Device 1, however, are more problematic. For example, in FIG. 1, when Endpoint Device N sends an inbound communication intended for Endpoint Device 1, Endpoint Device N will send that communication to the public IP address associated with NAT device 104(1). Endpoint Device N does not send the communication to the private IP address associated with Endpoint Device 1 because Endpoint Device N may not have knowledge of that private IP address (or other private IP addresses in the network 100). Thus, after Endpoint Device N sends the inbound communication to the NAT device 104(1), the NAT device 104(1) may not know the endpoint device in the private network to which the communication should be mapped. In other words, the NAT device 104(1) will receive the inbound communication from Endpoint Device N, but will not receive any instructions or any other indication (e.g., a destination private IP address) from Endpoint Device N to map the communication to Endpoint Device 1, since Endpoint Device N does not know the address information of Endpoint Device 1. When the NAT device 104(1) is responsible for managing multiple endpoint devices other than Endpoint Device 1, the inbound communication destined for Endpoint Device 1 may be dropped or incorrectly routed to the wrong endpoint device. In other words, for communications to pass through a NAT device, the communication must be initiated from a device within the private network. Thus, bandwidth probing of these network devices is necessary to ensure that these communications are possible.

Thus, the presence of NAT devices or firewalls in a network allow for only one way communications from endpoint devices in a private network to devices outside of the network that have public IP addresses. The inability to traverse NAT devices ("NAT device traversal") may cause disruptions for inbound communications from devices outside of a private network to endpoint devices behind NAT devices.

Additionally, NAT device traversal problems may cause disruptions in communications between endpoint devices in different private networks. For example, outbound and inbound communications between Endpoint Device 1 and endpoint device 102(2) ("Endpoint Device 2") may be disrupted due to the presence of the corresponding NAT devices 104(1) and 104(2). That is, since Endpoint Device 1 may only be aware of the public IP address associated with the NAT device 104(2) and not the private IP address associated with Endpoint Device 2, outbound communications may only be sent from Endpoint Device 1 to the NAT device 104(2). Likewise, since Endpoint Device 2 may only be aware of the public IP address associated with NAT device 104(1) and not the private IP address associated with Endpoint Device 1, inbound communications to Endpoint Device 1 may only be sent from Endpoint Device 2 to the NAT device 104(1).

In one example, for Voice over IP (VoIP) communications between Endpoint Device 1 and Endpoint Device 2, audio and/or video signaling communications may be disrupted due to the presence of NAT devices 104(1) and 104(2) between Endpoint Device 1 and Endpoint Device 2. Thus, NAT device traversal problems may pose problems for widespread deployment of network communications such as VoIP.

Several solutions, however, alleviate these problems. One solution involves eliminating NAT devices entirely and assigning public IP addresses to each endpoint device. This solution, however, may be undesirable or problematic due to the IPv4 address restrictions described above. Another solution uses dedicated IP tunneling techniques or public forwarding services to avoid the use of NAT devices for communications between endpoint devices.

Other techniques include implementing communication protocols to accomplish NAT device traversals. For example, a Session Traversal Utilities for NATs (STUN) protocol may be used for NAT traversal. The STUN protocol is described in the Request for Comments (RFC) 3489 memorandum published by the Internet Engineering Task Force (IETF). In general, the STUN protocol involves an endpoint device (referred to as a "STUN client") in a private network sending a binding request to a public server (referred to as a "STUN server") to receive a public IP address and/or a public port on the public server. The STUN server may be, for example, the relay server 106 in FIG. 1. After receiving the binding request from the STUN client, the STUN server sends a binding response message back to the STUN client to inform the STUN client of the IP address and public port on the STUN server assigned to the STUN client.

In another protocol, called a Traversal Using Relays around NATs (TURN) protocol (described in RFC 5766), an endpoint device (referred to as a "TURN client") in a private network sends TURN messages to a public server (referred to as a "TURN server") to allocate a public IP address and/or port on the TURN server. The TURN server may be, for example, the relay server 106. Upon receiving these allocation messages, the TURN server may send a response TURN allocation message to the TURN client to inform the TURN client of the allocated public IP address and port on the TURN. The TURN allocation message is shown, for example, at reference numeral 108 in FIG. 1, and the TURN reply allocation message is shown, for example, at reference numeral 110 in FIG. 1. It should be appreciated, however, that the messages shown in FIG. 1 may be used for other NAT traversal protocols (e.g., the STUN protocol, etc.).

The public IP address and/or port can be used by the TURN client for communications with other endpoint devices ("peer devices") in the network. For example, when Endpoint Device 1 is a TURN client that has been allocated a public IP address and port on the TURN server (relay server 106), any endpoint device in the network 100 can send inbound communications to Endpoint Device 1 by using the public IP address and/or port on the TURN server associated with Endpoint Device 1. Likewise, Endpoint Device 1 can send outbound communications to any other endpoint device in the network 100 that has similarly been allocated a public IP address and/or port on the TURN server. Thus, the TURN server forwards or "relays" communications to the appropriate TURN clients in the network based on the public IP address and/or port allocations for the TURN clients.

Additionally, after receiving an allocated IP address and port on the TURN server, the TURN client can send configuration messages to establish communications with selected endpoint devices in the network. The TURN client can also send probing messages to the TURN server after the public IP address and port have been allocated in order to determine network characteristics, as described by the techniques hereinafter. The probing messages are shown at reference numerals 112(1) and 112(2). In one example, the TURN protocol may be used together with the Interactive Connectivity Establishment (ICE) protocol described in RFC 5245 for NAT device traversal.

Figure 1:
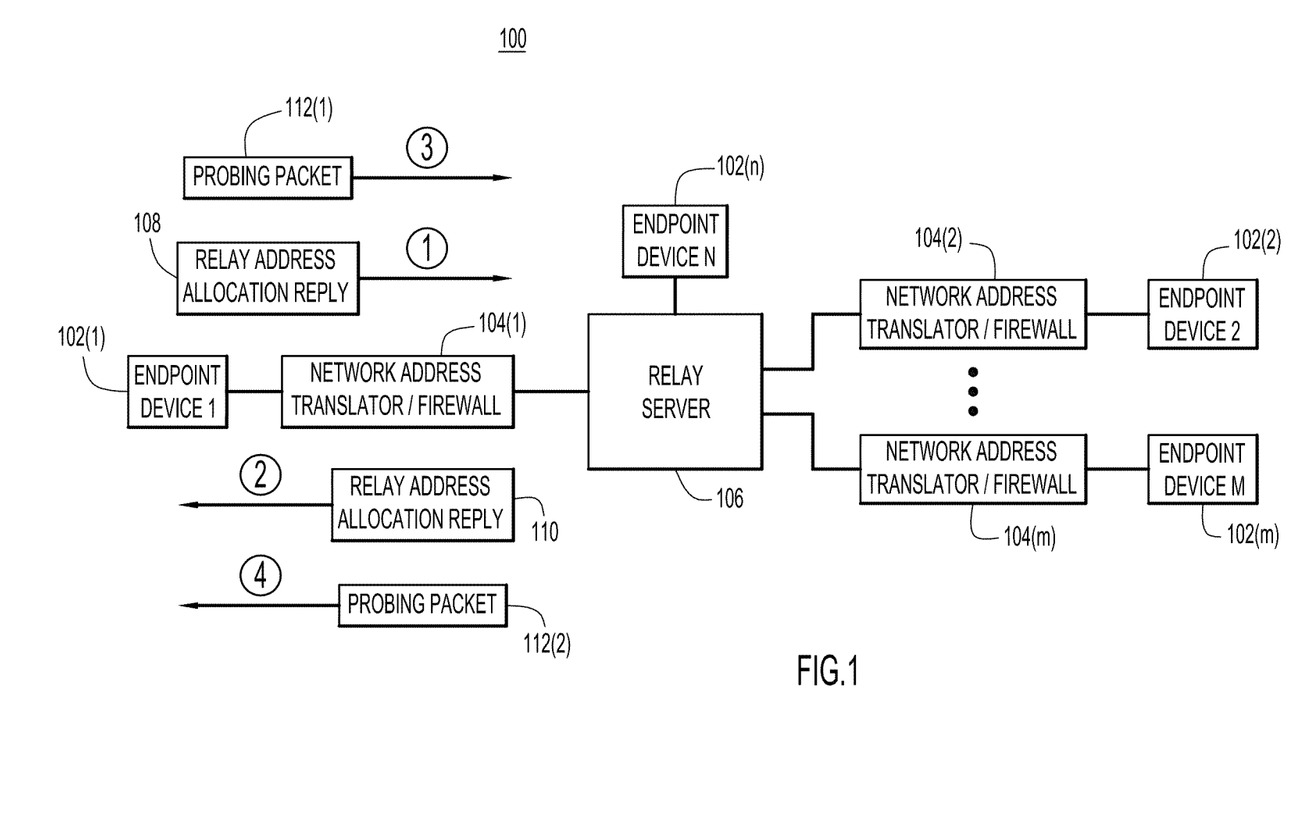
FIG. 1 shows an example system or network topology including a plurality of endpoint devices configured to exchange data communications with each other and to send and receive probing packets to determine network characteristics.
Figure 2:
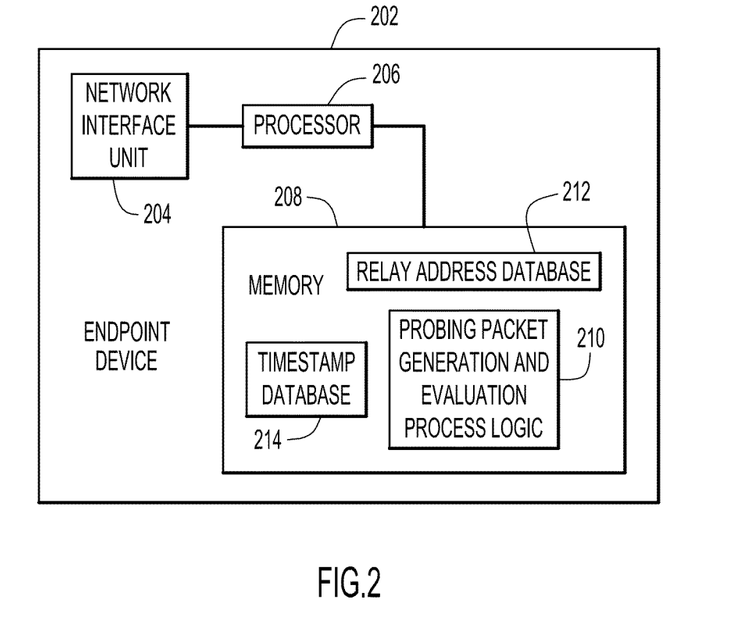
FIG. 2 shows an example block diagram of an endpoint device configured to generate and evaluate probing packets to determine the network characteristics.

Reference is now made to FIG. 2. FIG. 2 shows a block diagram of one of the endpoint devices 102(1)-102(n) in the network. FIG. 2 depicts the endpoint device generally at reference numeral 202, though it should be appreciated that the endpoint device 202 in FIG. 2 may represent any of the endpoint devices 102(1)-102(n) in FIG. 1. The endpoint device 202 comprises, among other components, a network interface unit 204, a processor 206 and a memory 208. The network interface unit 204 is configured to receive communications (e.g., packets) from devices in the network 100 and is configured to send communications to devices in the network 100. For example, the network interface unit 204 is configured to send and receive allocation packets (e.g., TURN allocation packets), probing messages, configuration messages, data communications, etc. The network interface unit 204 is coupled to the processor 206. The processor 206 is, for example, a microprocessor or microcontroller that is configured to execute program logic instructions (i.e., software) for carrying out various operations and tasks of the endpoint device 202, as described herein. For example, the processor 206 is configured to execute probing packet generation and evaluation process logic 210 to send probing packets to the relay server 106 and to determine characteristics of the network 100. The functions of the processor 206 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 208 may comprise read only memory (ROM), random access memory (RAM), magnetic disk storage media devices, optical storage media devices, flash memory devices, electrical, optical, or other physical/tangible (non-transitory) memory storage devices. The memory 208 stores software instructions for the probing packet generation and evaluation process logic 210. The memory 208 also hosts a relay address database 212, which stores the public IP address and port information on the relay server assigned to the endpoint device 202, and a timestamp database 214, which stores times that various communications are sent and received by the endpoint device 202. Thus, in general, the memory 208 may comprise one or more computer readable storage media (e.g., a memory storage device) encoded with software comprising computer executable instructions and when the software is executed (e.g., by the processor 206) it is operable to perform the operations described for the probing packet generation and evaluation process logic 210.

The probing packet generation and evaluation process logic 210 may take any of a variety of forms, so as to be encoded in one or more tangible computer readable memory media or storage device for execution, such as fixed logic or programmable logic (e.g., software/computer instructions executed by a processor), and the processor 206 may be an application specific integrated circuit (ASIC) that comprises fixed digital logic, or a combination thereof.

For example, the processor 206 may be embodied by digital logic gates in a fixed or programmable digital logic integrated circuit, which digital logic gates are configured to perform the probing packet generation and evaluation process logic 210. In general, the probing packet generation and evaluation process logic 210 may be embodied in one or more computer readable storage media encoded with software comprising computer executable instructions and when the software is executed operable to perform the operations described hereinafter.

Figure 3:
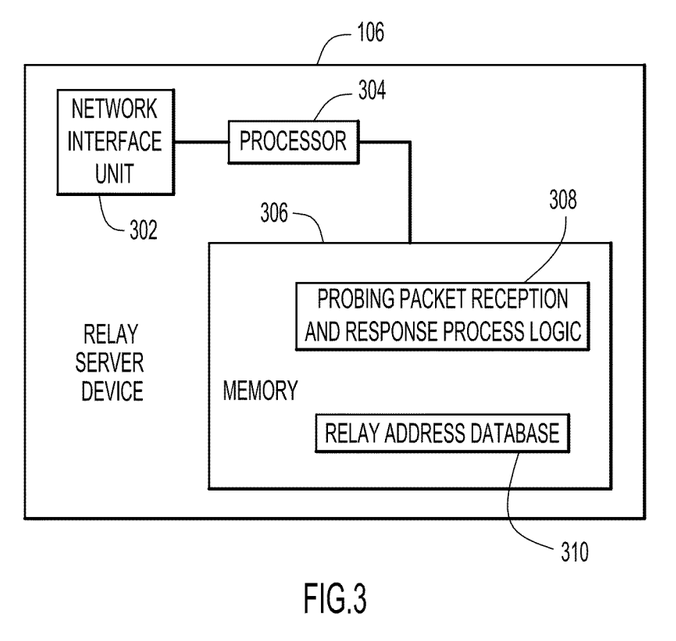
FIG. 3 shows an example block diagram of a relay server configured to relay communications between the endpoint devices and to receive probing packets from the endpoint devices.

Reference is now made to FIG. 3. FIG. 3 shows an example block diagram of the relay server device 106. The relay server device comprises, among other components, a network interface unit 302, a processor 304 and a memory 306. The network interface unit 302 and the processor 304 operate in a similar manner as the network interface unit 204 and the processor 206 described above for the endpoint device 202 in order to execute probing packet reception and response process logic 308. The probing packet reception and response process logic 308, when executed, causes the relay server device 106 to receive a probing packet from an endpoint device and to send a response to the probing packet to the endpoint device. The memory 306 of the relay server 106 is similar to the memory 208 of the endpoint device. The memory 306 stores a relay address database 310 that stores mapping information for allocated public IP addresses and ports on the relay server 106 and associated endpoint devices that receive the allocations.

In general, as stated above, various protocols may be used for NAT traversal techniques. Some of these protocols (e.g., the TURN protocol) allow for messages to be sent between an endpoint device requesting a public IP address and port allocation and the relay server 106, which allocates the public IP address and port. In addition, other messages may be sent between the endpoint device making the request and the relay sever 106. For example, in FIG. 1, Endpoint Device 1 may first send a relay address allocation request message 108 to the relay server, and the relay sever 108, in response, may send a relay address allocation reply message 110 to inform the Endpoint Device 1 of the public IP address and port allocated to it. After this allocation, the Endpoint Device 1 may send other messages to the relay server 106. For example, if the Endpoint Device 1 wants to initiate communications with, for example, Endpoint Device N, the Endpoint Device 1 can send configuration messages to the relay server 106 to configure the relay server 106 to forward or relay communications to and from the Endpoint Device N. For example, the Endpoint Device 1 can send configuration messages to the relay server 106 prior to VoIP communications between Endpoint Device 1 and Endpoint Device N.

Often times, however, the Endpoint Device 1 may want to obtain network information from the relay server 106 before initiating any communication with other endpoint devices. For example, VoIP communications or other communications may be bandwidth intensive, and thus, Endpoint Device 1 may want to ensure that the network 100 has sufficient bandwidth (and other characteristics) to support any communications that it may initiate at a later time. Thus, before sending configuration messages to the relay server 106, Endpoint Device 1 may send probing packets to the relay server 106 to obtain information that may be used to ultimately determine these network characteristics. For example, a port on a TURN server may be requested by sending normal configuration messages. After the port is requested, probe packets may be sent over the allocated port.

As shown in FIG. 1, the Endpoint Device 1 may send a probing packet 112(1) to the relay server 106, and the relay server 106, in response, may send a probing packet 112(2) back to Endpoint Device 1. The response probing packet 112(2) may be the same probing packet initially sent by Endpoint Device 1 to the relay server 106 or the probing packet may be a new packet generated and sent by the relay server 106. For example, the relay server 106 may receive the probing packet 112(1) and modify the header of the probing packet 112(1) from a "send indication" to a "data indication" to create the response probing packet 112(2). In one example, the relay server 106 may receive the probing packet 112(1) from Endpoint Device 1 (with a source address associated with Endpoint Device 1 and a destination address associated the relay server 106) and modify the source and destination address of the probing packet 112(1) to create the response probing packet 112(2) (by changing the source address from Endpoint Device 1 to the relay server 106 and by changing the destination address from the relay server 106 to the Endpoint Device 1). Upon receiving the response probing packet 112(2) from the relay server, Endpoint Device 1 can determine the characteristics of the network 100. For example, the Endpoint Device 1 can utilize information in the probing packets 112(1) and 112(2) to determine characteristics (e.g., bandwidth, jitter, roundtrip delay, latency, etc.) of the network 100.

For example, the Endpoint Device 1 allocates a port on the TURN server, and the TURN server allocates the port and sends a confirmation message to the Endpoint Device 1. This confirmation message also has the public address from the closest NAT device, if any. The public address is known at the "reflexive address". The Endpoint Device 1 then sets permissions on the TURN server that enables the TURN server to receive traffic from the NAT public address. In one example, the TURN server has a security feature that requires the Endpoint Device 1 to inform it of the addresses that the TURN server should accept and forward traffic from. After the Endpoint Device 1 sets the permissions on the TURN server, the Endpoint Device 1 can begin sending probe packets to the public side of the TURN server. The TURN server will see the probe packets coming from the NAT device, accept the packets, and send the packets back to Endpoint Device 1 via the allocated port on the TURN server.

In essence, the TURN server is set up as a loopback device. Thus, the probe packets can be sent and analyzed by the Endpoint Device 1 by itself. The techniques described hereinafter require support from only the Endpoint Device 1. That is, special software is not required on the TURN server as it does not need to understand the probing packets since it only needs to send the probing packets back to the Endpoint Device 1 (as it would do with any other packets destined for Endpoint Device 1).

Figure 4A:
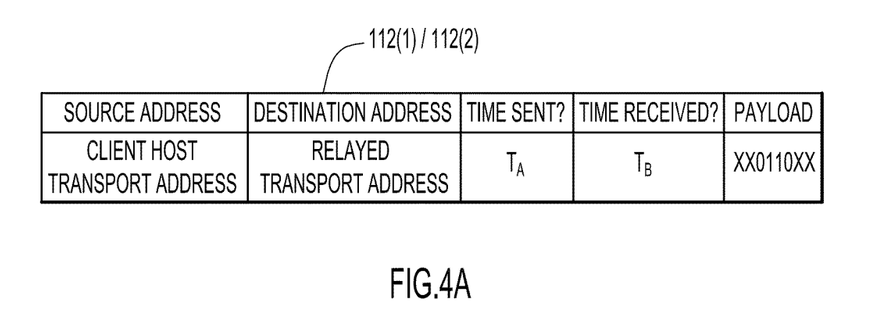
FIGS. 4A and 4B show examples of the probing packets and the network characteristics determined by the endpoint device from information in the probing packets.
Figure 4B:
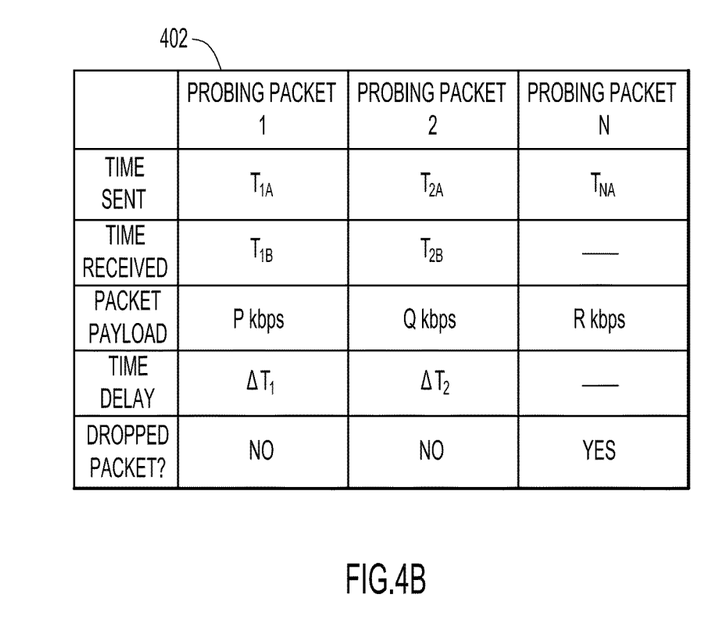

Reference is now made to FIGS. 4A and 4B. FIG. 4A shows an example of a probing packet at reference numeral 112(1)/112(2). FIG. 4B shows an example of data 402 that is stored by an endpoint device (e.g., in the timestamp database 214) described above. In FIG. 4A, the probing packet 112(1)/112(2) has a source address field that indicates the client host transport address (e.g., the private IP address associated with Endpoint Device 1) and a destination address field that indicates the relayed transport address (e.g., the public IP address on the relay sever 106 that has been allocated to Endpoint Device 1). Additionally, the probing packet 112(1)/112(2) comprises timestamp fields that indicate a first time instance at which the probing packet 112(1)/112(2) is sent from Endpoint Device 1 to the relay server 106 and a second time instance at which the probing packet 112(1)/112(2) is received from the relay server 106. Furthermore, the probing packet 112(1)/112(2) comprises a payload field that may be used to determine the bandwidth characteristics of the network 100, as described hereinafter.

Endpoint Device 1 may, for example, send multiple successive probing packets to the relay server 106. FIG. 4B shows data that is stored in the timestamp database 214 for each of these successive packets. For example, when a first probing packet ("probing packet 1") is sent to the relay server 106 at time $T_{1,A}$ and received from the relay server 106 at time $T_{2,A}$, the Endpoint Device 1 is able to determine the time delay ("roundtrip delay") of the network 100 by determining the time difference between time $T_{2,A}$ and time $T_{1,A}$ (depicted as $\Delta T_1$ in FIG. 4B). Additionally, from this information, the Endpoint Device 1 can also determine the latency and jitter characteristics of the network 100. The Endpoint Device may store similar information for additional packets ("probing packet 2" to "probing packet N") to update the roundtrip delay, jitter, latency, etc. determinations.

The Endpoint Device 1 may also store information regarding the size of the packet payload and whether or not the packet was dropped by the relay server 106. For example, probing packet 1 may have a packet payload of "P" kilobits, probing packet 2 may have a packet payload of "Q" kilobits, and so on. The Endpoint Device 1 can determine the bandwidth of the network 100 by evaluating the payload size of the probing packet and determining the time of transmission and whether or not the packet was dropped by the relay server 106.

Figure 5:
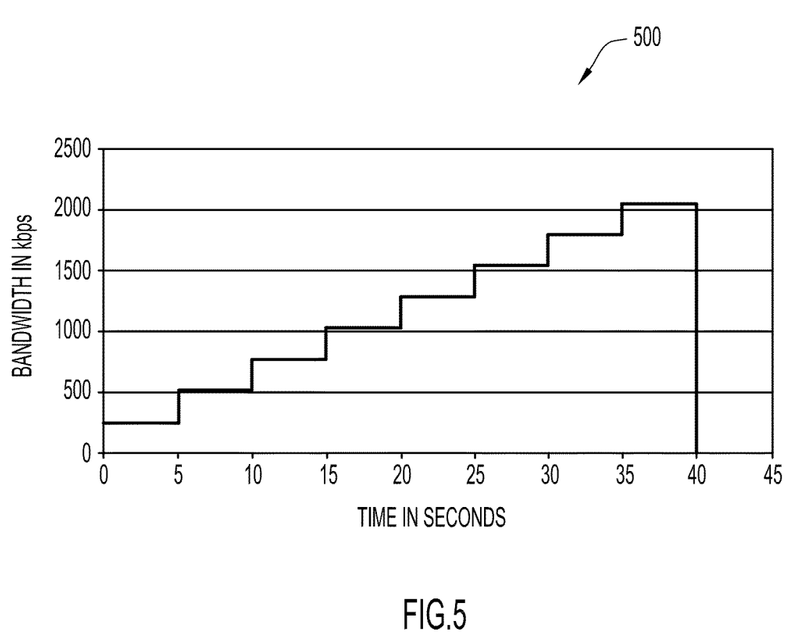
FIG. 5 shows an example chart depicting successive probing packets sent by the endpoint device with incrementally large payloads to determine network bandwidth characteristics.

Reference is now made to FIG. 5, which shows an example chart at reference numeral 500 depicting successive probing packets sent by an endpoint device. In FIG. 5, the probing packets have incrementally larger payloads to determine bandwidth characteristics of the network 100. For example, FIG. 5 shows successive probing packets being periodically sent from Endpoint Device 1 to the relay server 106. Each of the successive probing packets comprises a payload having a different payload size from an immediately preceding probing packet. The Endpoint Device 1 determines a maximum bandwidth capacity of the network 100 based on the payload size of the probing packets. For example, Endpoint Device 1 may send probing packets with incrementally larger payloads than the immediately preceding probing packets to the relay server 106 until a packet loss is detected by the Endpoint Device 1. Additionally, Endpoint Device 1 may send probing packets with incrementally larger payloads until a predetermined percentage (e.g., ten percent) of packet loss events has been detected by Endpoint Device 1. As shown in FIG. 5, probing packets with incrementally larger payloads between, e.g., 250 kbps and 2100 kpbs may be sent to the relay sever 106 before a packet drop is detected. Thus, the network bandwidth may be determined to be the bandwidth corresponding to the payload of the last packet that was successfully received (e.g., 2100 kbps or 2.1 megabits per second in FIG. 5). It should be appreciated that FIG. 5 is used merely as an example, and any type of payload of any size may be sent between Endpoint Device 1 and the relay server 106.

After determining the maximum bandwidth capacity of the network, the Endpoint Device 1 may determine whether or not the network 100 supports data communications (e.g., VoIP communications) from Endpoint Device 1 based on the connectivity characteristics of Endpoint Device 1 to the network. For example, the bandwidth capacity that is determined will provide an indication on how the networks that the endpoint devices are connected to behave. If, for example, Endpoint Device N is connected to a particularly bad network (e.g., low bandwidth capacity), the poor nature of the network can be determined. If the network does support data communications from Endpoint Device 1 to Endpoint Device N, Endpoint Device 1 can send configuration messages to the relay server 106 to establish relay and forwarding rules and can initiate communications with Endpoint Device N. For example, in the course of establishing these communications, Endpoint Device 1 may send signaling messages to Endpoint Device N in accordance with a Session Initiation Protocol (SIP).

Figure 6:
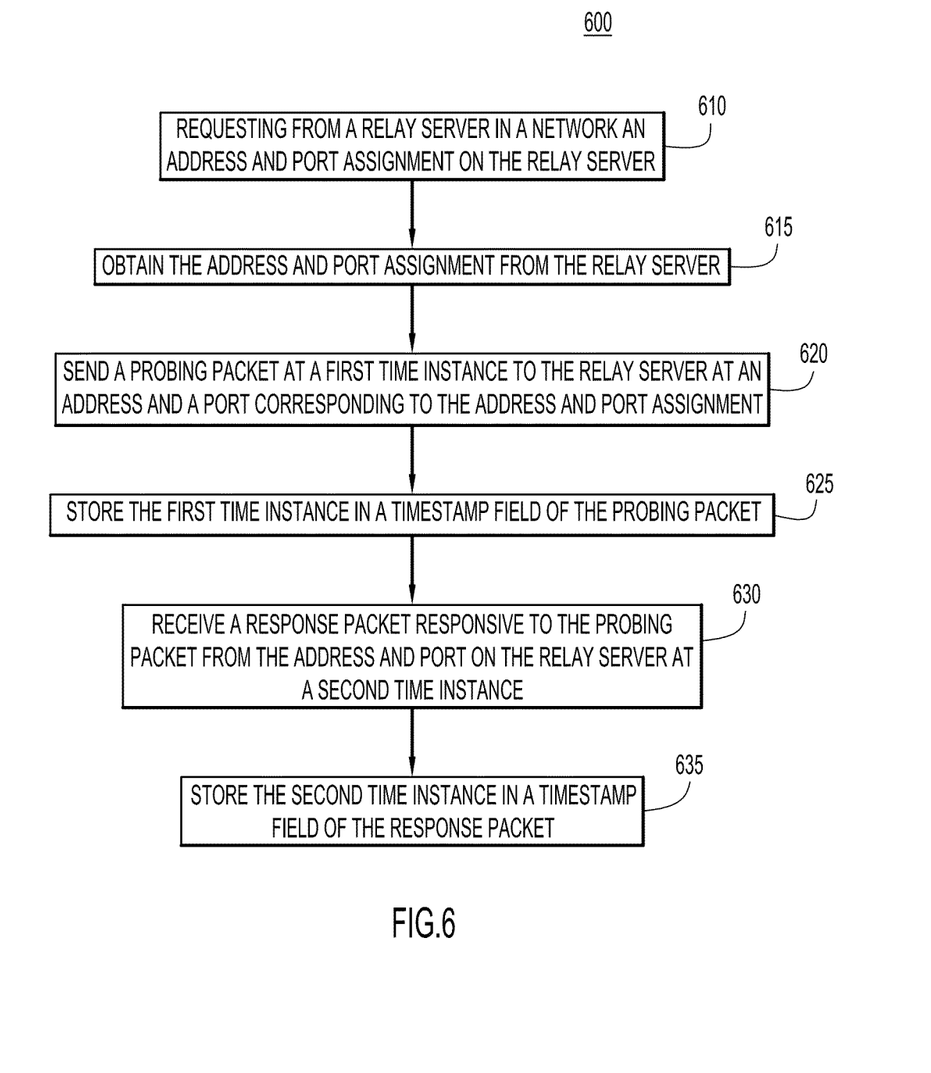
FIG. 6 shows an example flow chart depicting operations performed by the endpoint device to determine the network characteristics.

Reference is now made to FIG. 6. At reference numeral 600, FIG. 6 shows an example flow chart depicting operations performed by an endpoint device (e.g., Endpoint Device 1) to determine characteristics of a network. At operation 610, Endpoint Device 1 requests from the relay server 106 in the network 100 an address and port assignment on the relay server 106. At operation 615, the Endpoint Device 1 obtains the address and port assignment from the relay server 106 and, at operation 620, sends a probing packet 112(1) at a first time instance to the relay server 106. The probing packet 112(1) is sent to the relay server 106 at an address and a port corresponding to the address and port assignment. At operation 625, the first time instance is stored in a first time stamp field of the probing packet 112(1). The probing packet 112(2) is received from the relay server, at operation 630, from the address and the port at a second time instance. At operation 635, the second time instance is stored in a second timestamp field. From this information, and the payload information of the probing packet, Endpoint Device 1 can determine characteristics of the network 100 such as roundtrip delay, jitter, latency, bandwidth, etc.

It should be appreciated that the techniques described above in connection with all embodiments may be performed by one or more computer readable storage media that is encoded with software comprising computer executable instructions to perform the methods and steps described herein. For example, the operations performed by the Endpoint Device 1 may be performed by any of the endpoint devices 102(1)-102(n) by one or more computer or machine readable storage media (non-transitory) or device executed by a processor and comprising software, hardware or a combination of software and hardware to perform the techniques described herein. Similarly, the operations performed by the relay server 106 may be performed by one or more computer or machine readable storage media (non-transitory) or device executed by a processor and comprising software, hardware or a combination of software and hardware.

In sum, a method is provided comprising: at a first endpoint device configured to communicate with a second endpoint device in a network, requesting from a relay server in the network an address and a port assignment on the relay server; obtaining the address and port assignment from the relay server; sending a probing packet at a first time instance to the relay server at an address and a port corresponding to the address and port assignment, wherein the first time instance is stored in a first timestamp field; receiving a response packet responsive to the probing packet from the address and port on the relay server at a second time instance; and storing the second time instance in a timestamp field of the response packet.

In addition, an apparatus is provided comprising: a network interface unit; a memory; and a processor coupled to the network interface unit and the memory and configured to: request from a relay server in a network an address and port assignment on the relay server; obtain the address and port assignment from the relay server; send a probing packet at a first time instance to the relay server at an address and a port corresponding to the address and port assignment, wherein the first time instance is stored in a timestamp field of the probing packet; receive a response packet responsive to the probing packet from the address and port on the relay server at a second time instance; and store the second time instance in a timestamp field of the response packet.

Furthermore, one or more computer readable storage media encoded with software is provided comprising computer executable instructions and when the software is executed operable to: request from a relay server in a network an address and port assignment on the relay server; obtain the address and port assignment from the relay server; send a probing packet at a first time instance to the relay server at an address and a port corresponding to the address and port assignment, wherein the first time instance is stored in a first timestamp field; receive a response packet responsive to the probing packet from the address and port on the relay server at a second time instance; and store the second time instance in a timestamp field of the response packet.

The above description is intended by way of example only. Various modifications and structural changes may be made therein without departing from the scope of the concepts described herein and within the scope and range of equivalents of the claims.

What is claimed is:

1. A method, comprising:
at a first endpoint device configured to communicate with a second endpoint device in a network, requesting from a relay server in the network an address and a port assignment on the relay server;
obtaining the address and port assignment from the relay server;
sending a probing packet at a first time instance to the relay server at an address and a port corresponding to the address and port assignment, wherein the first time instance is stored in a timestamp field of the probing packet;
receiving a response packet responsive to the probing packet from the address and port on the relay server at a second time instance;
storing the second time instance in a timestamp field of the response packet;
periodically sending successive probing packets to the relay server, wherein each of the successive probing packets comprises a payload having a different payload size from an immediately preceding probing packet; and
determining a maximum bandwidth capacity of the network based on the payloads of the successive probing packets.

2. The method of claim 1, further comprising analyzing the first time instance and the second time instance to determine roundtrip delay, latency and jitter characteristics of the network.

3. The method of claim 1, wherein sending the plurality of probing packets comprises sending the successive probing packets each having an incrementally larger payload than the immediately preceding probing packet until a packet loss is detected by the first endpoint device.

4. The method of claim 1, wherein sending the plurality of probing packets comprises sending the successive probing packets each having an incrementally larger payload than the immediately preceding packet until a predetermined percentage of packet loss events has been detected by the first endpoint device.

5. The method of claim 1, further comprising:
determining whether or not the network supports data communications from the first endpoint device to the second endpoint device via the relay server based on the maximum bandwidth capacity of the network; and
responsive to the determining indicating that the network supports the data communications, sending the data communications to the second endpoint device via the relay server at the address and port.

6. The method of claim 5, wherein sending the data communications to the second endpoint device comprises sending Voice over Internet Protocol (VoIP) data communications to the second endpoint device.

7. The method of claim 5, wherein sending the data communications to the second endpoint device comprises sending signaling messages to the second endpoint device in accordance with a Session Initiation Protocol (SIP).

8. The method of claim 1, wherein sending comprises sending the probing packet with information comprising instructions to configure the relay server to receive packets from the second endpoint device at the address and port and to send packets to the second endpoint device from the address and port.

9. The method of claim 1, further comprising informing the relay server to send the response packet to the first endpoint device after the relay server receives the probing packet.

10. The method of claim 1, wherein the first endpoint device is configured to communicate with the relay server using one of a Traversal Using Relays around a Network Address Translator (TURN) protocol and a Session Traversal Utilities for a Network Address Translator (STUN) protocol.

11. The method of claim 1, further comprising sending a message to the relay server in order to allow for the sending and receiving of the probing packets.

12. An apparatus comprising:
a network interface unit;
a memory; and
a processor coupled to the network interface unit and the memory, wherein the processor:
requests from a relay server in a network an address and port assignment on the relay server;
obtains the address and port assignment from the relay server;
sends a probing packet at a first time instance to the relay server at an address and a port corresponding to the address and port assignment, wherein the first time instance is stored in a first timestamp field of the probing packet;
receives a response packet responsive to the probing packet from the address and port on the relay server at a second time instance;
stores the second time instance in a timestamp field of the response packet;
periodically sends successive probing packets to the relay server, wherein each of the successive probing packets comprises a payload having a different payload size from an immediately preceding probing packet; and
determines a maximum bandwidth capacity of the network based on the payloads of the successive probing packets.

13. The apparatus of claim 12, wherein the processor analyzes the first time instance and the second time instance to determine roundtrip delay, latency and jitter characteristics of the network.

14. The apparatus of claim 12, wherein the processor sends the successive probing packets with each having an incrementally larger payload than the immediately preceding probing packet until a packet loss is detected by the apparatus.

15. The apparatus of claim 12, wherein the processor sends the successive probing packets each having an incrementally larger payload than the immediately preceding packet until a predetermined percentage of packet loss events has been detected by the apparatus.

16. The apparatus of claim 12, wherein the processor further:
determines whether or not the network supports data communications from the apparatus to an endpoint device via the relay server based on the maximum bandwidth capacity of the network; and
responsive to the processor determining that the network supports the data communications, sends the data communications to the endpoint device via the relay server at the address and port.

17. The apparatus of claim 16, wherein the processor sends Voice over Internet Protocol (VoIP) data communications to the endpoint device.

18. The apparatus of claim 16, wherein the processor sends signaling messages to the endpoint device in accordance with a Session Initiation Protocol (SIP).

19. The apparatus of claim 12, wherein the processor sends the probing packet with information comprising instructions to configure the relay server to receive packets from the endpoint device at the address and port and to send packets to the endpoint device from the address and port.

20. The apparatus of claim 12, wherein the processor further informs the relay server to send the response packet to the apparatus after the relay server receives the probing packet.

21. The apparatus of claim 12, wherein the processor communicates with the relay server using one of a Traversal Using Relays around a Network Address Translator (TURN) protocol and a Session Traversal Utilities for a Network Address Translator (STUN) protocol.

22. One or more non-transitory computer readable storage media encoded with software comprising computer executable instructions that cause a processor to:
  request from a relay server in a network an address and port assignment on the relay server;
  obtain the address and port assignment from the relay server;
  send a probing packet at a first time instance to the relay server at an address and a port corresponding to the address and port assignment, wherein the first time instance is stored in a timestamp field of the probing packet;
  receive a response packet responsive to the probing packet from the address and port on the relay server at a second time instance;
  store the second time instance in a timestamp field of the response packet;
  periodically send successive probing packets to the relay server, wherein each of the successive probing packets comprises a payload having a different payload size from an immediately preceding probing packet; and
  determine a maximum bandwidth capacity of the network based on the payloads of the successive probing packets.

23. The non-transitory computer readable storage media of claim 22, further comprising instructions that cause the processor to analyze the first time instance and the second time instance to determine roundtrip delay, latency and jitter characteristics of the network.

24. The non-transitory computer readable storage media of claim 22, further comprising instructions that cause the processor to send the plurality of probing packets each having an incrementally larger payload than the immediately preceding probing packet until a packet loss is detected by the first endpoint device.

25. The non-transitory computer readable storage media of claim 22, further comprising instructions that cause the processor to send the plurality of probing packets each having an incrementally larger payload than the immediately preceding packet until a predetermined percentage of packet loss events has been detected by the first endpoint device.

26. The non-transitory computer readable storage media of claim 22, further comprising instructions that cause the processor to:
  determine whether or not the network supports data communications from a first endpoint device to a second endpoint device via the relay server based on the maximum bandwidth capacity of the network; and
  responsive to determining that the network supports the data communications, send the data communications to the second endpoint device via the relay server at the address and port.

27. The non-transitory computer readable storage media of claim 22, further comprising instructions that cause the processor to send the probing packet with information comprising instructions to configure the relay server to receive packets from the second endpoint device at the address and port and to send packets to the second endpoint device from the address and port.

28. The non-transitory computer readable storage media of claim 22, further comprising instructions that cause the processor to communicate with the relay server using one of a Traversal Using Relays around a Network Address Translator (TURN) protocol and a Session Traversal Utilities for a Network Address Translator (STUN) protocol.

\* \* \* \* \*